J. TEMPLE.
AUTOMATIC MEASURING DEVICE.
APPLICATION FILED AUG. 11, 1914.
1,160,787.
Patented Nov. 16, 1915.
2 SHEETS—SHEET 1.
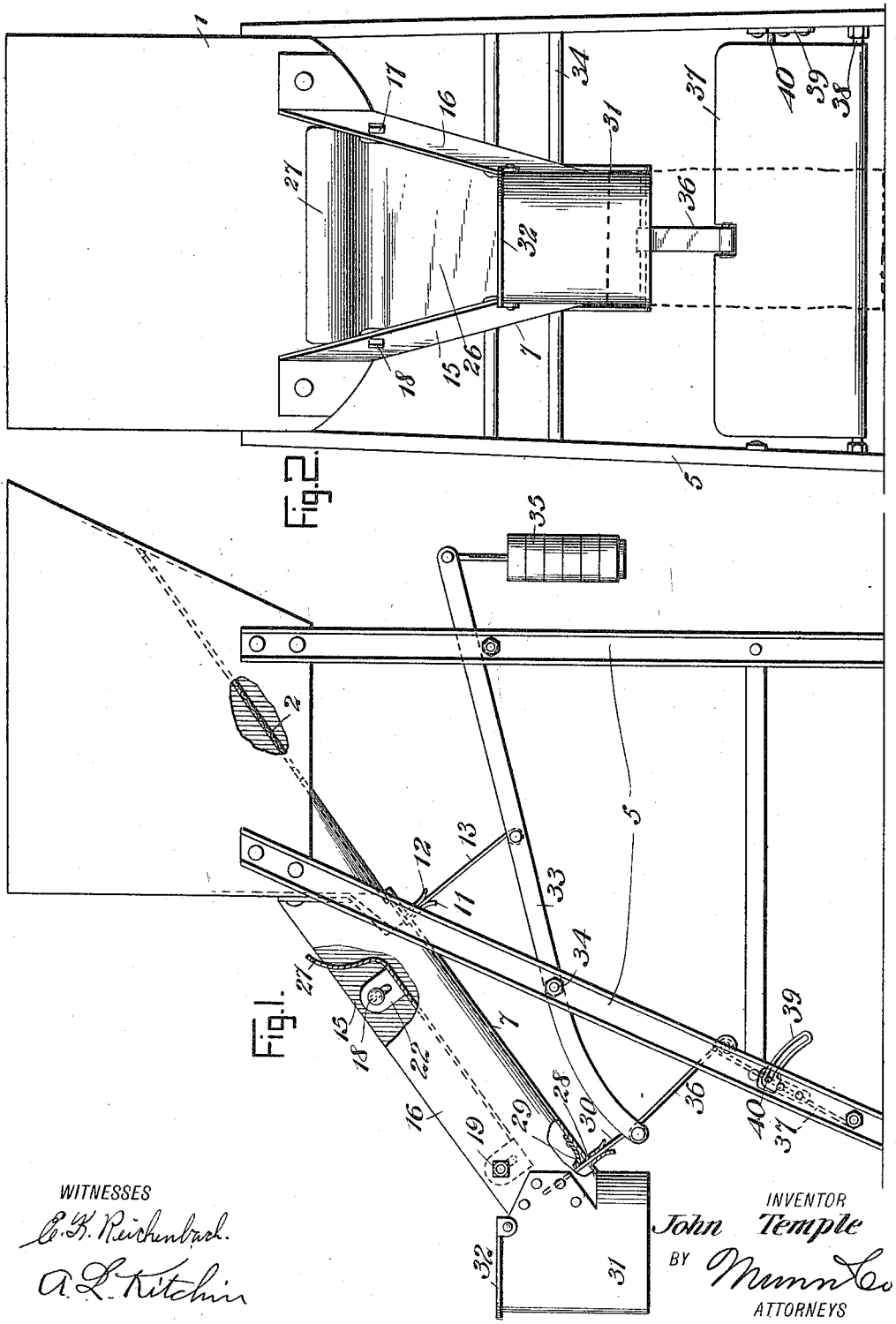
WITNESSES
C. K. Reichenbach.
A. L. Kitchin.
INVENTOR
John Temple
BY Munn & Co.
ATTORNEYS

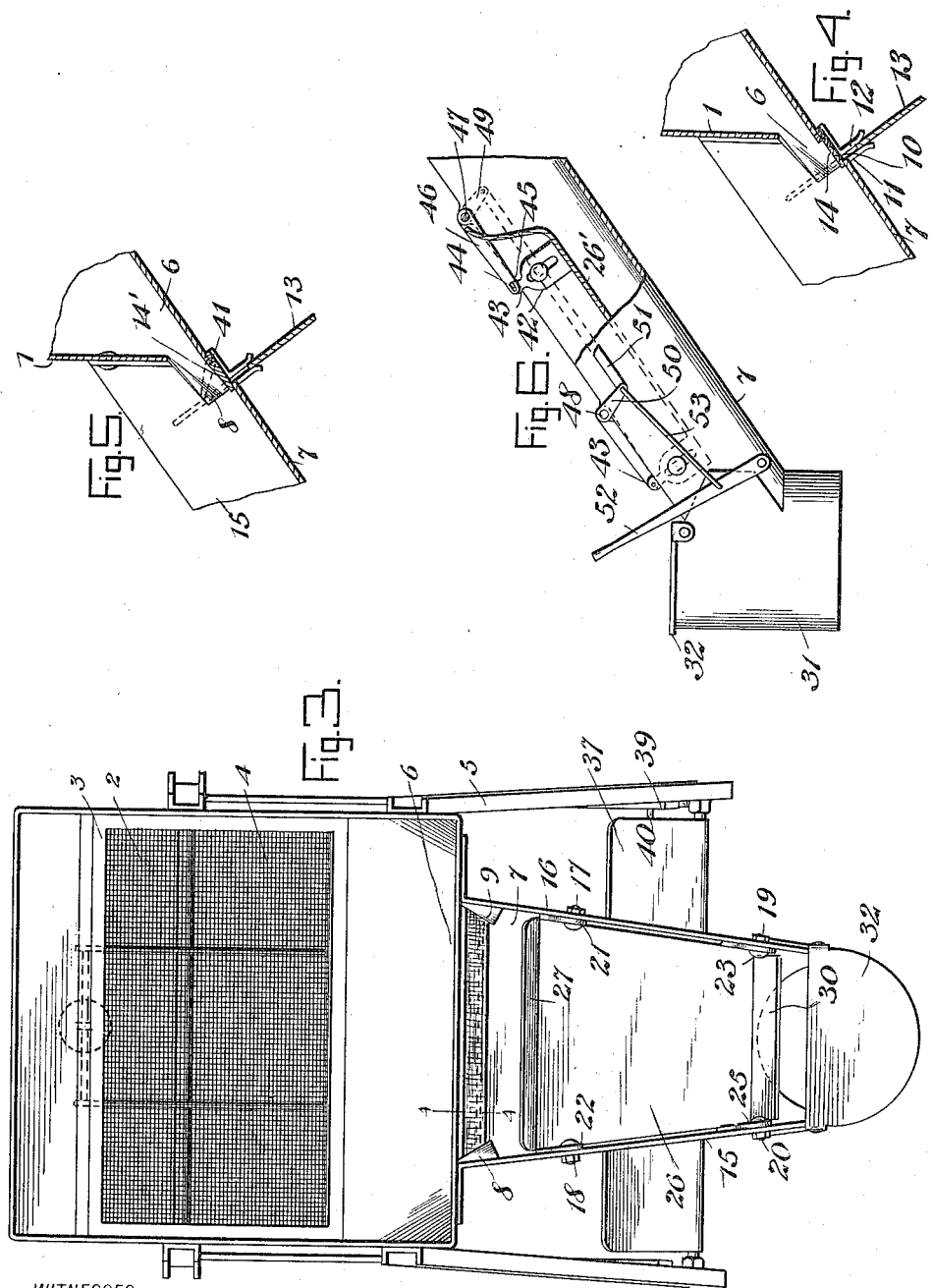

UNITED STATES PATENT OFFICE.

JOHN TEMPLE, OF PLAINFIELD, NEW JERSEY.

AUTOMATIC MEASURING DEVICE.

1,160,787.  Specification of Letters Patent.  Patented Nov. 16, 1915.

Application filed August 11, 1914. Serial No. 856,219.

*To all whom it may concern:*

Be it known that I, JOHN TEMPLE, a subject of the King of England, and a resident of Plainfield, in the county of Union and State of New Jersey, have invented a new and Improved Automatic Measuring Device, of which the following is a full, clear, and exact description.

This invention relates to improvements in measuring devices, and particularly to devices for measuring granular matter, and has for an object to provide an improved construction whereby a predetermined amount of granular matter, as for instance coal, may be measured and discharged in certain measured quantities.

Another object of the invention is to provide an improved measuring device wherein the measuring device is partially formed from a discharge chute so that as the matter is measured the same is guided to a receiving receptacle.

In carrying out the objects of the invention a hopper is provided which may be of any desired kind, and which is preferably formed with a removable bottom either in the form of a screen or a solid bottom. This bottom is designed to discharge into a chute which is provided with a pair of gates connected with a pivotally mounted lever. A suitable weight or spring is connected with the lever so as to hold the same in a predetermined position for preventing the matter in the hopper from passing out of the chute. A treadle mechanism member is connected with the lever so as to reverse the action of the guides and thereby allow the matter in the chute to be discharged while holding back the matter in the hopper. By thus discharging the matter in the chute a measured quantity is dispensed. An adjustable top is provided for the chute which may be moved for changing the quantity measured whereby different quantities may be dispensed from the same chute. This adjustable top may be arranged to be quickly adjusted upon the operation of a power lever or may be adjusted through the action of bolts and sliding supports.

In the accompanying drawings Figure 1 is a side view of an embodiment of the invention, certain parts being broken away for better illustrating the construction; Fig. 2 is a front view of the structure shown in Fig. 1; Fig. 3 is a top plan view of the structure shown in Fig. 1; Fig. 4 is a detailed fragmentary sectional view through Fig. 3, the same being taken approximately on the line 4—4; Fig. 5 is a view similar to Fig. 4 but showing a slightly modified form of the invention; Fig. 6 is a detailed fragmentary view of a chute embodying a slightly modified form of the invention to that shown in Fig. 1.

Referring to the accompanying drawings by numerals, 1 indicates a hopper of any desired description, which hopper is provided with a removable bottom 2. The bottom 2 is preferably formed with a frame 3 carrying a wire mesh 4. If desired a solid bottom may be substituted for the wire mesh without departing from the spirit of the invention. The hopper 1 may be supported by any desired means, as for instance a suitable framework 5. One side of the hopper is provided with an opening 6, which opening is of less width than the hopper but approximately the same width as the chute 7. In order that the coal or other matter in the hopper 1 may freely feed into the chute 7 deflecting members 8 and 9 are provided whereby the stream of coal or other matter is restricted and thereby freely flows into the chute until the same is filled. The bottom of the chute 7 is provided with a slot 10, which slot has guiding members 11 and 12 arranged on each side thereof for guiding a gate 13, which gate extends from deflecting member 8 to deflecting member 9. In order to cover the slot 16 when the gate 13 is in its lowered position as shown in Fig. 1 a flexible flap or covering member 14 is provided which may be connected to the chute in any desired manner, as for instance rivets. When the gate 13 is raised its flap is moved up, and when the gate is lowered the flap moves down automatically, the weight of the coal assisting the automatic movement of the same. The chute 7 is provided with sides 15 and 16 which accommodate bolts 17, 18, 19 and 20, which bolts are designed to pass through suitable slots in ears 21, 22, 23 and 25, respectively, which ears project from what may be termed the cover or measuring plate 26. The cover 26 is provided with a shield 27 at the upper end as shown more clearly in Fig. 1 so as to prevent the accidental spilling of any of the coal. Arranged adjacent the lower end of the chute 7 is a slot 28 normally covered by a flexible strip 29. This slot is designed to accommodate a gate 30, which gate is normally held in a raised position as shown in Fig. 1 and consequently prevents the flow of any coal from chute 7. It is to be noted from Fig. 1 that gate 30 is raised when gate 13 is lowered and gate 13 is raised when gate 30 is lowered. The raising of gate 13 as gate 30 is lowered prevents any additional supply of fuel entering the space beneath cover 6, while the coal is being discharged from the chute. Connected to the lower end of the chute 7 is a tubular member 31 provided with a hinged top 32. A bag or other article may be held beneath or partially telescoped over the discharge nozzle 31 as shown in dotted lines in Fig. 2 when the same is being filled. When it is desired to measure a greater or less amount of coal the bolts holding the top 26 in place are loosened and the top is raised or lowered as desired and the bolts again tightened.

In connection with the gates 13 and 30 it will be observed that the same are connected by a lever 33 which is pivotally mounted at 34 on the frame 5 and carries at one end a weight 35, which weight normally holds the parts in the position shown in Fig. 1. It is evident that a spring could be used instead of weight 35 without departing from the spirit of the invention. A link 36 is pivotally connected with lever 33 at the front end and also pivotally connected to a foot treadle 37, which foot treadle is pivotally mounted on bar 38, bar 38 being supported by suitable means, as for instance by extending into the frame 5. It is to be noted from Fig. 2 that the treadle 37 extends on opposite sides of the discharge nozzle 31 so that the operator may stand on either side of the nozzle 31 and operate the treadle 37. The preferable way of operating the device is to use the hands in holding the bag adjacent the nozzle 31 while the treadle 37 is depressed by one of the feet. In order to prevent a large movement of the treadle 37 a stop bar 39 is provided which is formed with an arc-shaped slot into which pin 40 extends, pin 40 being rigidly connected in any desired manner with the treadle 37.

In Fig. 5 will be seen a slightly modified form of the invention in which the covering member 14′ is formed from metal or some other comparatively stiff material, which member is hinged at 41 to the chute so that the cover may be easily raised by gate 13 and may easily move downward over the slot 10.

In Fig. 6 will be seen a modified form of the chute structure, and particularly the top. Referring to this figure by numerals 26′ indicates the top which is provided with a plurality of ears 42, each of which is formed with an extension 43. Extensions 43 accommodate pins 44 which project through slots 45 in levers 46, which levers are rigidly secured to shafts 47 and 48. Shafts 47 and 48 are rigidly connected with arms 49 and 50, which arms are connected by a link 51. The arm 50 is connected to link 52 whereby when lever 52 is moved in one direction the various parts just described will be moved and will raise top 26′, and when moved in the opposite direction will lower top 26′, thus causing a greater or less amount of coal to be measured. This adjustment may be made quickly and at any time, whereby this particular construction is adapted for dispensing different quantities from the same bin while the construction shown in Fig. 1 is more particularly adapted for dispensing substantially the same quantity a number of times in succession. The construction shown in Fig. 1 may be adjusted for dispensing any desired quantity but the adjustment is much slower than the adjustment provided in Fig. 6.

The various parts have been described more especially in relation to dispensing coal in small quantities, but it will be evident that other substances besides coal may be dispensed without departing from the spirit of the invention, and that the bin or hopper 1 may be made of any desired material and supported in any desired manner.

What I claim is—

1. In a measuring and dispensing device for coal and the like, an inclined chute provided with a transverse slot in the bottom adjacent each end, a movable covering member for each of said slots, a gate slidingly mounted in each of said slots, a bar connecting said gates, means for pivotally mounting said bar whereby the upper gate is held normally open and the lower gate is held normally closed, and mechanism connected with said bar for reversing the position of said gates.

2. In a coal dispensing and measuring device, a hopper, an inclined chute extending therefrom provided with spaced slots in the bottom, a flap for each of said slots adapted to normally cover the slots, gates adapted to be forced upwardly through said slots, said gates moving said flaps to one side, means for causing one gate to move upwardly while the other moves downwardly, and means for adjusting the capacity of said chute.

In testimony whereof I have signed my name to this specification in the presence of two subscribing witnesses.

JOHN TEMPLE.

Witnesses:
 E. FRANK VAIL,
 JOSEPH T. VAIL.

Copies of this patent may be obtained for five cents each, by addressing the "Commissioner of Patents, Washington, D. C."